United States Patent Office.

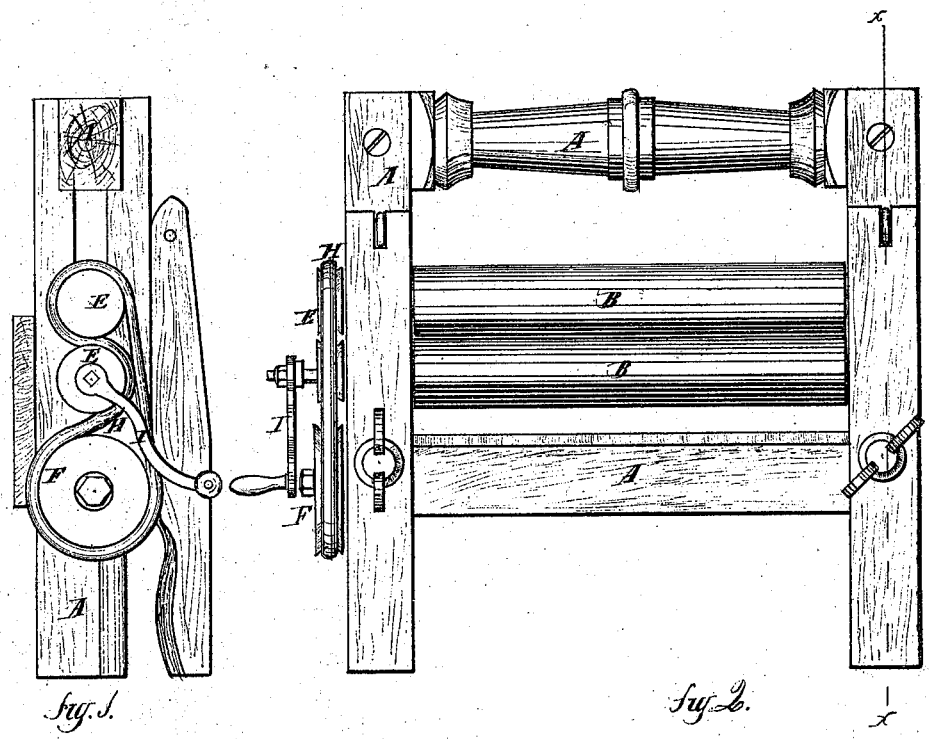
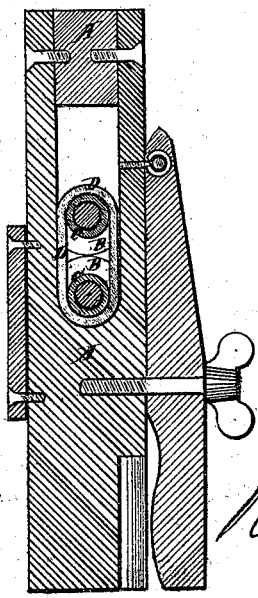

ROBERT E. FERGUSON, OF CHICAGO, ILLINOIS.

Letters Patent No. 107,893, dated October 4, 1870.

IMPROVEMENT IN CLOTHES-WRINGERS.

The Schedule referred to in these Letters Patent and making part of the same.

I, ROBERT E. FERGUSON, of Chicago, in the county of Cook and State of Illinois, have invented a new and useful Improvement in Clothes-Wringers, of which the following is a specification, reference being had to the accompanying drawing.

The object and nature of my invention relates to a combination of parts more fully hereafter described.

Description of the Drawing.

Figure 1 represents an end view of my wringer;
Figure 2, a side elevation of the same; and
Figure 3, a sectional view at the line $x\ x$.

General Description.

A is the frame of the clothes-wringer.
B are the rollers.
C are the bearings for the rollers.
D are elastic pieces, holding the bearings C.
I ordinarily make these elastic holders of rubber, and there is one at each end of the rollers to hold the bearings C.

When thick garments or several thicknesses of clothes are drawn between the rollers, the elastic holders D allow the rollers to separate, so that the clothes can pass through, but the pressure increases as the rollers are thrown apart, and, consequently, the thick garments receive more pressure, and also the elastic holders allow the bearings C to turn to an inclined position with the roller.

It will be observed then, that whatever position the rollers may assume, relative to each other, they always rest evenly on their bearings.

E are pulleys on the rollers B, and

F is a pulley revolving on a spindle attached to the frame A.

H is an elastic band, passing over the pulleys E and F.

I is a crank-handle, for turning the rollers.

The spindle on which the pulley F turns is stationary. The pulleys E are firmly secured to the rollers B.

When the crank-handle I is turned, the friction of the belt H upon the other pulleys turns them, and if the rollers B are pressed apart by thick garments, the tension of the belt H is increased, and there will be friction sufficient to drive the rollers.

The belt operates equally well whether the rollers are parallel or form an angle to each other.

J are clamps, hinged to the frame A at K, for clamping it to the wash-tub for use.

L are thumb-nuts for tightening the clamps.

My wringer is simple, cheap, and durable. It is effective, and will readily adapt itself to all the requirements of machines for that purpose.

Claim.

Having described the construction and operation of my improved clothes-wringer,

What I claim, and desire to secure by Letters Patent, is—

The pulleys E and F, having adjustable bearings C, in combination with the elastic belt H, constructed and arranged substantially as specified and shown.

ROBT. E. FERGUSON.

Witnesses:
HEINRICH F. BRUNS,
L. L. COBURN.